Aug. 10, 1965  A. BECHLER  3,199,385
MECHANISM FOR CONTROLLING THE MOVEMENTS OF A CUTTING TOOL
IN AN AUTOMATIC MACHINE TOOL
Filed Feb. 20, 1963  2 Sheets-Sheet 1

INVENTOR.
ANDRE BECHLER
BY
RICHEY, McNENNY, & FARRINGTON
ATTORNEYS.

INVENTOR.
ANDRE BECHLER
BY
RICHEY, McNENNY, & FARRINGTON
ATTORNEYS

United States Patent Office 3,199,385
Patented Aug. 10, 1965

3,199,385
MECHANISM FOR CONTROLLING THE MOVEMENTS OF A CUTTING TOOL IN AN AUTOMATIC MACHINE TOOL
André Bechler, 4 Rue Centrale, Moutier, Bern, Switzerland
Filed Feb. 20, 1963, Ser. No. 259,926
Claims priority, application Switzerland, Feb. 28, 1962, 2,461/62
3 Claims. (Cl. 82—5)

The present invention relates to a mechanism for controlling the movements of a cutting tool on a automatic machine tool so that the tool during the phase of each working cycle of the machine tool performs a plurality of similar elementary cycles of movement of which each is composed of a feeding movement, a forward movement, a restoring movement and a return movement, and that the tool at the same time undergoes a continuous feed motion caused by a cam that executes one revolution per working cycle of the machine tool.

Such mechanism forming the subject matter of the present invention may in typical examples form a part of a screw-cutting apparatus adapted to constitute an attachment of an automatic lathe, or a self-contained automatically-working threading machine, and may serve for controlling the movements of the threading chisel.

One feature of the attachment disclosed by the invention consists in that on a supporting member controlled by said cam a slide is guided to be reciprocable in direction of the feeding and restoring movements of the cutting tool, a further feature consists in that a tool holder is guided on the slide to be movable in direction of the forward and return movements of the tool, a rotary member carrying a radial cam and a bell cam is rotatably mounted on said slide and a lever is pivotally mounted on said slide; a further feature consists in that said lever has a first portion taking rest on said supporting member and a second portion engaging said radial cam, while the tool holder under spring action follows the contour of said bell cam, a still further feature consists in that means are provided for continuously turning said rotary member in such manner that during said phase of each working cycle it executes a plurality of revolutions.

Figure 1:
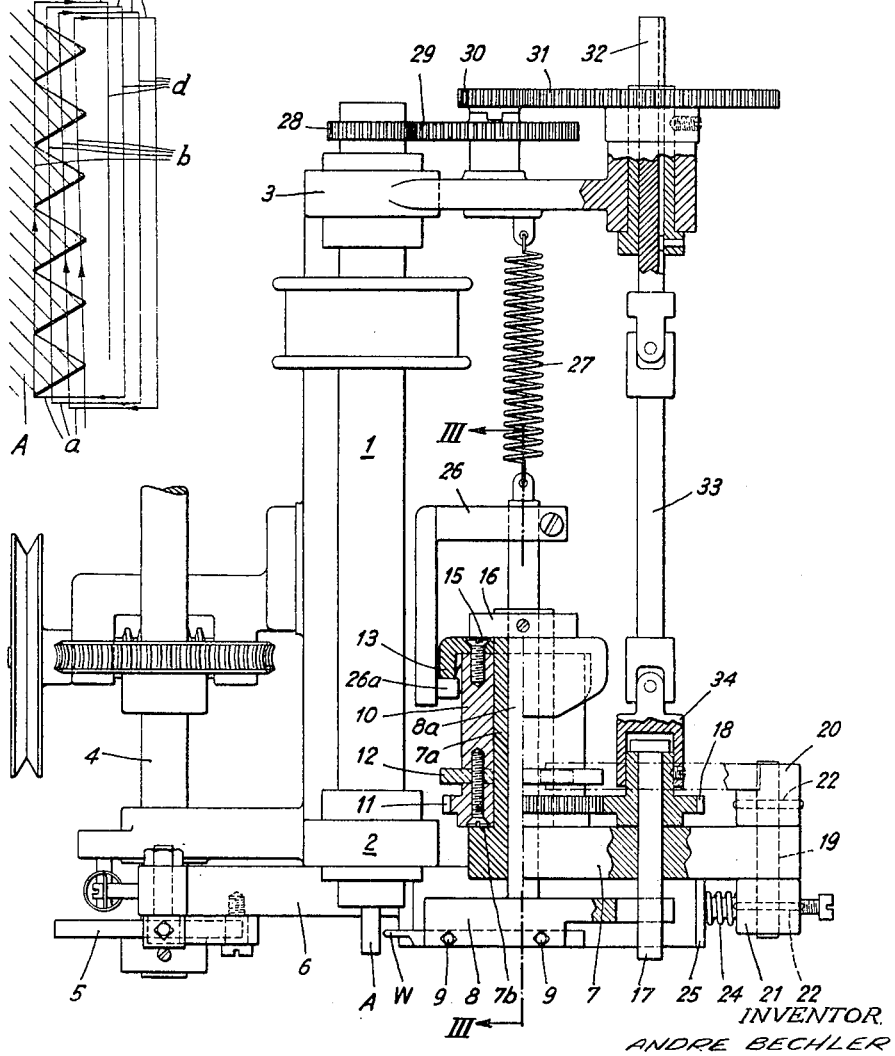
Figure 2:
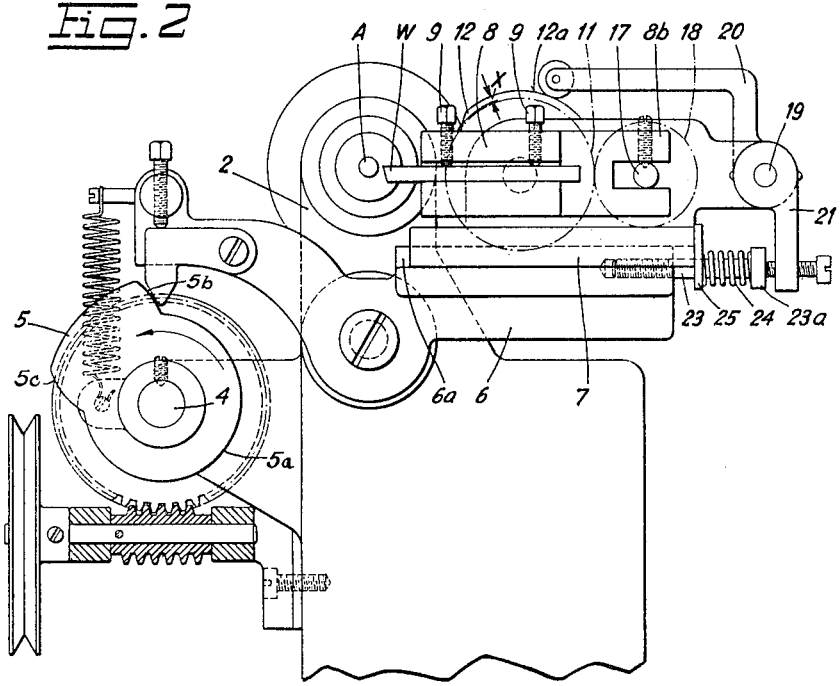
Figure 3:
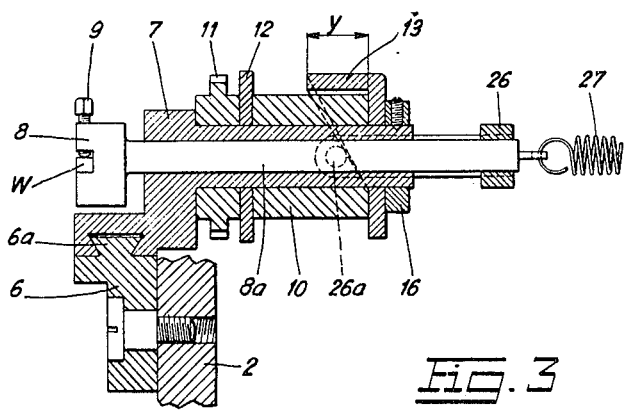

A preferred embodiment of the invention will now be described by way of example with reference to the accompanying drawings in which:

FIG. 1 shows the attachment more or less diagrammatically in plan view, partly in section, many parts not necessary for the understanding of the invention being omitted, FIG. 2 is an appurtenant side elevation, FIG. 3 shows a section on the line III—III of FIG. 1, and FIG. 4 diagrammatically depicts the movements of the tip.

The numeral 1 designates the work carrying spindle that is rotatably mounted in bearings 2 and 3 and belongs to an automatic lathe (or to a special threading machine) to which also belongs the conventional main control shaft 4 which performs one revolution per working cycle. In an automatic lathe, as known, a plurality of cam discs 5 are mounted on said control shaft 4, of which each through an appurtenant tracer controls, within a working cycle, tool slides and tool-carrying rockers which, for example, are arranged fanlike in a quite conventional manner. Only one of these rockers, designated with 6, is shown.

In the example shown, said rocker 6 (or it might also be one of said tool-carrying slides) is provided with a dove-tail guide 6a for a slide 7 which thus is guided movable in direction of the feeding and restoring movements of the tool W. In a portion 7a of said slide 7, which is in the form of a cylindrical bushing, is guided the bar-like portion 8a of a tool holder 8 movable in direction of the forward and return movements of the tool W. Said tool holder is provided with clamping screws 9 for chucking the tool W which here is a threading chisel.

On the portion 7a is rotatably mounted a rotary member comprising a sleeve 10, a gear 11, a radial-cam disc 12 and a bell-shaped cam 13 as well as screw 15 (FIG. 1) which serve for interconnecting these parts. Said rotary member is longitudinally positively located between a shoulder 7b and an adjusting ring 16 secured to said portion 7a. The tool holder 8 is prevented from turning with respect to slide 7 by forked end-portion 8b engaging a bearing pin 17 which is firmly held in a bore of slide 7 and at the same time serves for rotatably mounting a pinion 18 that meshes with gear 11.

In another bore of slide 7 is mounted the axle pin 19 of a bell crank comprising also two arms 20, 21 which by pins 22 are fixed to the pin 19. Arm 21 takes rest on a pin 23 firmly screwed into the rocker 6, and the arm 20 contacts the contour 12a of cam disc 12 under the action of a compression spring 24 which is inserted under initial tension between a head 23a of pin 23 and a small plate 25 screwed fast to slide 7. In cooperation with this spring 24 cam disc 12 thus controls the feeding and restoring movements of slide 7 together with the tool holder 8 and the tool W. The forward and return movements are controlled by the bell cam 13, since a clip 26 clamped to the rear end of the barlike portion 8a of tool holder 8 has a tracer knob 26a constantly abutting against bell cam 13 under the action of a tension spring 27 anchored to the rear edge of tool holder portion 8a.

Rotary member 10 to 13 is rotated by the work-carrying spindle 1 via a gear train 28 to 31 and a Cardan joint shaft 32 to 34; portion 32 of this shaft is connected to gear 31 through sliding key to be longitudinally movable with respect to this gear, whilst portion 34 is secured to the hub of pinion 16. Thus there is provided a drive conection having a constant ratio of transmission of, for example, one to twenty-four from the spindle 1 to the rotary member 10 to 13.

The mode of operation of tool W on a work A when thread cutting, is shown diagrammatically in FIG. 4 which depicts the path of the tool tip. The line sections a refer to the feeding movements, the line sections b refer to the (slow) forward movements when the tool is in effective operation, c refers to the restoring movements, and d to the (rapid) return movements. The steepness of the line sections b depends on the slope of the sub-sections of section 5a of cam disc 5 effective at any one time. Such slope of the sections b in the last but one (or already in the last but two) forward movement is already very low, and is zero in the last forward movement or already in the last but one, and thus also the chip thickness is practically zero. The feeding movements (line sections a) and the restoring movements (line sections c) have all the same amplitude which is determined solely by the height X of the cam swell (FIG. 2) of cam disc 11. Similarly, the amplitude of both the forward and return movements (line sections b and d respectively) is determined solely by the height Y of the cam swell of the bell-cam 13 (FIG. 3).

In our example (FIG. 4) the rotary member 10 to 13 performs about four revolutions in the time during which section 5a of the cam disc 5 acts on the rocker 6 (sections 5b and 5c controlling the approach and return, respectively); each such revolution may be said to constitute an elementary cycle of movement of the tool W and during such elementary cycle the work-carrying spindle performs twenty-four revolutions as determined by the ratio of transmission mentioned more above. The period of effective action of the tool W on the workpiece during each elementary cycle is that during which the tool tip travels along one of the line sections *b* of FIG. 4 and may amount to substantially more than a half of the duration of the elementary cycle. The feeding and restoring movements along line sections *a* and *c* respectively are very short and controlled by short slopes of cam disc 12; the return movements along the line sections *d* may be relatively quick, being determined by a steep slope of the bell-cam 13, whilst the feeding motions along line sections *b* are controlled by a less steep slope of the bell-cam 13 and so provide a relatively long period of effective action of the tool during each elementary cycle. During each such period (one per elementary cycle) one of the sub-sections of section 5*a* of the profile of cam disc 5 is active and determines the steepness of the corresponding line section *a*.

As most of the components are assembled on the rocker 6 that is controlled by cam disc 5, the entire operation of thread cutting in an automatic lathe (or thread cutting machine) takes place during the passage of the swell of cam disc 5 under the tracer arm of rocker 6, and thus represents only one phase in each operating cycle of the lathe or thread cutting machine, while the other phases (including other working operations controlled by the other cams mounted on control shaft 4) are carried out in a well known manner. It also is obvious that after separation of the Cardan shaft piece 34 from pinion 18, rocker 6 may be replaced by a conventional tool-carrying rocker (while at the same time removing the Cardan shaft piece 32 from gear 31).

The attachment of the present invention also may be used on a thread-cutting machine proper, the cam-disc swell with profile sections 5*a*, 5*b*, 5*c* then extending over the major portion of the circumference of the cam disc 5.

The attachment also may be conveniently used for controlling other tools instead of a turning chisel, for example a grinding disc. To such end, a grinding head (for example for grinding the threads on a work already hardened) could be mounted on tool holder 8.

Many modifications could be made in the embodiment which has been described by way of example. If no thread is to cut, the rotary member 10 to 13 may be driven by motor means that are not in drive connection with the work-carrying spindle.

What I claim is:

1. A mechanism for controlling the movements of a cutting tool on a workpiece rotating about a longitudinal axis in an automatic machine tool so that the cutting tool during one phase of each working cycle performs a plurality of similar elementary cycles of movement each of which comprises a feeding, a forward, a restoring and a return movement and simultaneously undergoes a continuous feeding movement toward said workpiece, comprising a feed cam operable through one revolution per working cycle to provide said continuous feeding movement, a movable supporting member adapted to be controlled by said feed cam, a slide guided on the supporting member to be reciprocable in the direction of the tool's feeding and restoring movements, guide bushing means on said slide, a tool holder on the one side of said slide adjacent said workpiece and having a bar-like portion extending from one side of said tool holder and mounted for longitudinal sliding movement in said guide bushing means to guide said tool holder in the direction of the tool's forward and return movement, guide means on said slide and said tool holder to prevent rotation of said tool holder about the axis of said bar-like portion, a lever pivotally mounted on said slide intermediate its ends and having one end operatively connected to said supporting member, a rotary member mounted on said slide on the side away from said tool holder to be rotatable about an axis perpendicular to the direction of movement of the slide and including a radial cam and a bell-cam, said lever having the other end engageable with said radial cam whereby said radial cam is operable to shift said slide through said feeding and restoring movements, first resilient means for biasing said other end of said lever into engagement with said radial cam and biasing said slide toward said workpiece, cam follower means operable by said bell-cam and operatively carried on said bar-like portion whereby said bell-cam is operable to move said tool holder in the direction of the tool's forward and return movements, second resilient means for holding said follower means into engagement with the profile of said bell-cam and means for continuously rotating the rotary member through more than one revolution during one cycle of movement of said feed cam and said supporting member.

2. The mechanism as set forth in claim 1 wherein said guide bushing means also serves to journal said rotary member whereby said bar-like portion is co-axial with said rotary member.

3. The mechanism as set forth in claim 1 including a drive connection of constant transmission ratio between said rotating workpiece and said rotary member whereby a thread may be cut on said workpiece in a multiplicity of passes according to the number of revolutions performed by said rotary member during one cycle of movement of said feed cam.

References Cited by the Examiner

UNITED STATES PATENTS

| 2,204,441 | 6/40 | Ogilvie | 82—5 |
| 2,590,224 | 3/52 | Armstrong | 82—5 X |
| 3,016,777 | 1/62 | Garombo | 82—5 |

FOREIGN PATENTS

| 290,061 | 7/53 | Switzerland. |
| 352,214 | 3/61 | Switzerland. |

WILLIAM W. DYER, Jr., *Primary Examiner.*